(12) United States Patent
Owen

(10) Patent No.: US 7,918,165 B2
(45) Date of Patent: Apr. 5, 2011

(54) COMPONENT CONTAINER WITH DUNNAGE AND METHOD FOR USING THE SAME

(75) Inventor: John Michael Owen, Douglasville, GA (US)

(73) Assignee: Magna International Inc., Aurora (CA)

( * ) Notice: Subject to any disclaimer, the term of this patent is extended or adjusted under 35 U.S.C. 154(b) by 326 days.

(21) Appl. No.: 12/050,291

(22) Filed: Mar. 18, 2008

(65) Prior Publication Data

US 2008/0237225 A1 Oct. 2, 2008

Related U.S. Application Data

(60) Provisional application No. 60/921,062, filed on Mar. 30, 2007.

(51) Int. Cl.
  *B65D 19/44* (2006.01)
(52) U.S. Cl. ...................... 108/55.1; 108/55.3
(58) Field of Classification Search ................ 108/55.1, 108/55.3, 55.5, 51.11; 410/43, 4, 3, 30, 67; 414/233; 206/386, 355
  See application file for complete search history.

(56) References Cited

U.S. PATENT DOCUMENTS

| | | | | |
|---|---|---|---|---|
| 3,524,415 A | * | 8/1970 | Heiman | 108/53.3 |
| 3,605,636 A | * | 9/1971 | Blunden et al. | 410/3 |
| 3,857,494 A | * | 12/1974 | Giardini | 108/55.1 |
| 4,733,781 A | * | 3/1988 | Gerlach | 410/43 |
| 5,011,347 A | * | 4/1991 | Bullock | 410/30 |
| 5,213,458 A | * | 5/1993 | Preller et al. | 410/26 |
| 5,439,152 A | * | 8/1995 | Campbell | 108/55.1 |
| 6,006,676 A | * | 12/1999 | Creek et al. | 108/55.3 |
| 6,585,224 B1 | * | 7/2003 | Schmidt | 108/55.1 |
| 6,615,742 B1 | * | 9/2003 | Swanson | 108/55.1 |
| 6,688,819 B1 | * | 2/2004 | Bradel | 410/67 |
| 6,832,562 B2 | * | 12/2004 | Tabor et al. | 108/55.1 |
| 6,966,734 B2 | * | 11/2005 | Toteff | 410/30 |

* cited by examiner

*Primary Examiner* — José V Chen
(74) *Attorney, Agent, or Firm* — Warn Partners, P.C.

(57) ABSTRACT

A reusable container for a golf car component having a body operably associated with at least one bottom and top support member, the bottom and top support members are adapted to receive a bottom dunnage piece and top dunnage piece respectively, the bottom and top dunnage pieces each having contact surfaces to engage and retain a golf car component. The body includes a base portion, opposing sidewall portions, and a back portion. The bottom support member is operably connected to the base portion of the body, and the top support member is operably connected to the back portion of the body. A plurality of recesses and profiles formed in the bottom and top dunnage pieces provides contact surfaces adapted for nestably receiving and separating a plurality of a golf car component.

22 Claims, 6 Drawing Sheets

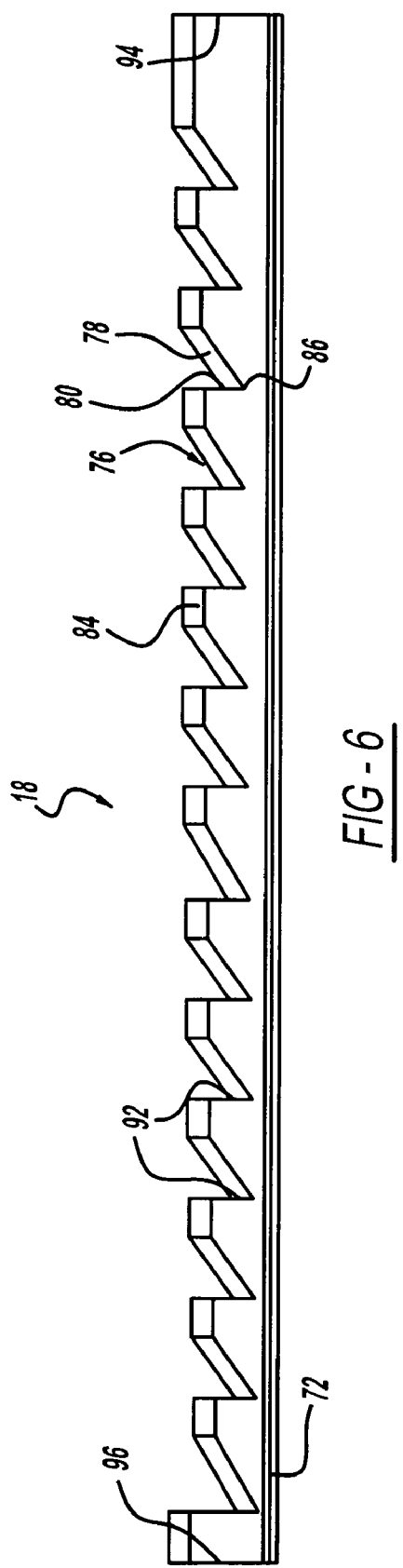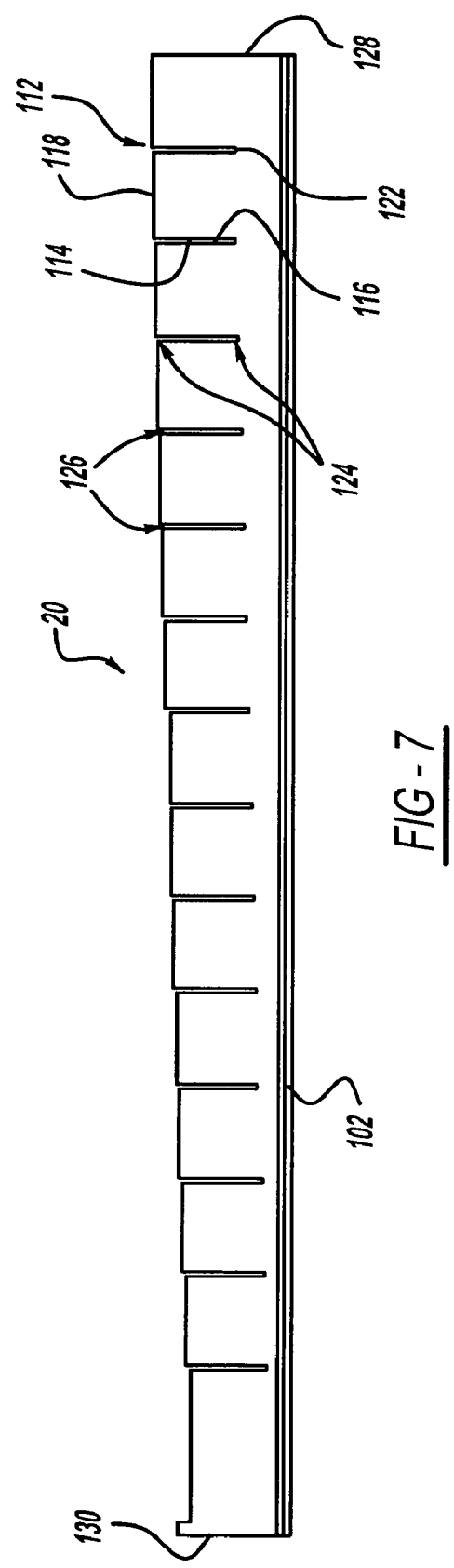

COMPONENT CONTAINER WITH DUNNAGE AND METHOD FOR USING THE SAME

This application claims the benefits of U.S. Provisional Application No. 60/921,062, filed Mar. 30, 2007.

FIELD OF THE INVENTION

The present invention relates to a reusable container which is used for storing and transporting parts.

BACKGROUND OF THE INVENTION

Reusable and returnable containers are generally known, and are commonly used by component manufacturers for the purpose of storing and shipping different products to end users. Typically, reusable containers are loaded with manufactured components and shipped to an assembly plant of an end user. The end user removes the components from the reusable container and the empty container is returned to the component manufacturer for reuse in subsequent shipments. Reusable containers can also be used by the component manufacturer to store and transport parts throughout various internal manufacturing processes, i.e., from an injection molding machine to a paint station, assembly station, and the like. The return and reuse of component containers reduces the demand for new containers which aids in reducing container purchasing and disposal costs.

However, one area of development is reusable containers in the golf car industry. Problems can occur in utilizing reusable containers for larger golf car components due to an undesirable storage space capacity within the container, inefficient logistics and container storage, and operator ergonomic concerns. Accordingly, there exists a need for a more advanced reusable container which can safely maximize storage capacity for golf car components to help provide an ergonomic and effective storage and shipment solution.

SUMMARY OF THE INVENTION

The present invention is a reusable container for a golf car component having a body operably associated with at least one bottom and at least one top support member, wherein the bottom and the top support members are adapted to receive a bottom and top dunnage piece respectively, the bottom and top dunnage pieces have contact surfaces adapted for nestably receiving a plurality of the golf car component. The body includes a base portion, opposing first and second sidewall portions, and a back portion. The bottom support member is operably connected to the base portion of the reusable container and the top support member is operably connected to the back portion of the reusable container. A plurality of recesses and profiles formed in the bottom and top dunnage piece respectively provides contact surfaces to engage and retain a plurality of large golf car components respectively.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 6 is a side view of the bottom dunnage piece as seen from the left side of FIG. 3, according to the present invention; and FIG. 7 is a side view of the top dunnage piece as seen from the left side of FIG. 4, according to the present invention.

DETAILED DESCRIPTION OF THE PREFERRED EMBODIMENTS

Figure 1:
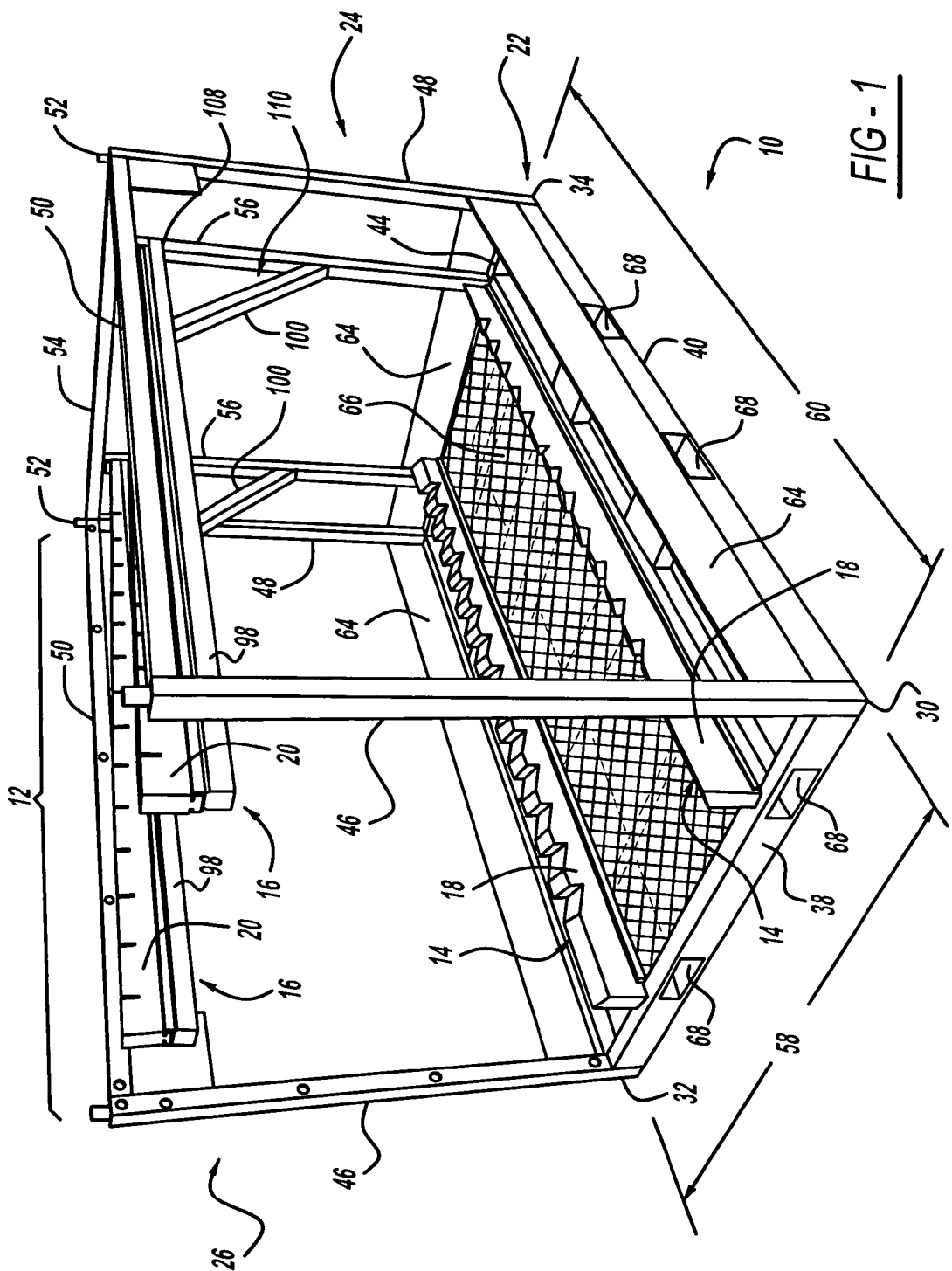
FIG. 1 is a perspective view of a reusable container, according to the present invention.

The following description of the preferred embodiment(s) is merely exemplary in nature and is in no way intended to limit the invention, its application, or uses.

Referring to the Figures, wherein like numerals indicate like or corresponding parts throughout the several views, a reusable container is shown generally at 10. The reusable container 10 has a body 12 operably connected to at least one bottom support member 14 and at least one top support member 16. The bottom support member 14 is adapted to receive a bottom dunnage piece 18 and the top support member 16 is adapted to receive a top dunnage piece 20. The relationship of the bottom and top dunnage pieces 18,20, described further hereinafter, allows for the maximum amount of golf car components to be loaded into the reusable container 10 without causing damage.

The body 12, preferably formed of metal, further comprises a base portion 22, opposing first and second sidewall portions 24,26, and a back portion 28. The outermost sides of the body 12 generally defines the outside perimeter of the reusable container 10 and the innermost sides of the body 12 generally defines the inside usable space of the reusable container 10 used for storing a plurality of a golf car component. The base portion 22 includes four corners shown generally at 30,32,34,36 disposed adjacent to a ground surface. A front beam 38 extends substantially between the corners 30 and 32 at the front open side of the reusable container 10, which is the side for operator egress. A first side beam 40 extends substantially between the corners 30 and 34 disposed along the first sidewall portion 24. A second side beam 42 extends substantially between the corners 32 and 36 along the second sidewall portion 26. A back beam 44 extends substantially between the corners 32 and 36 at the rear side of the reusable container 10. Preferably, the front beam 38, first and second side beams 40,42, and back beam 44 are each formed of a plurality of operably connected beams.

The opposing first and second sidewalls 24,26 each include a front end post 46 extending vertically from the ground surface at the corners 30,32. The front beam 38 and first and second side beams 40,42 are operably connected to the front end posts 46 respectively. Rear end posts 48 extend vertically from the ground surface at the corners 34,36. The back beam 44 and first and second side beams 40,42 are operably connected to the rear end posts 48. A top beam 50 disposed near the top of the reusable container 10 extends between the front and rear end posts 46,48 of the first and second sidewalls 24,26.

The back portion 28 of the reusable container 10 includes a horizontal beam 54 and at least one support beam 56. The horizontal beam 54 is disposed near the top of the reusable container 10 and extends between the rear end posts 48. The support beam 56 extends vertically between the horizontal beam 54 and the base portion 22. Preferably, the reusable container 10 has two spaced apart support beams 56 as illustrated in FIGS. 1-2.

The distance between the corners 30,32 forms the reusable container's 10 width 58, preferably 57 inches and defines the front of the reusable container 10 operable for egress. The distance between the corners 30 and 34 forms an axial length 60, preferably 96 inches. The vertical distance between the corners and the top of the rack forms a height 62, preferably 55 inches. The height 62 can include tapered stacking caps 52 disposed on the top of the front and rear end posts 46,48. While these dimensions are preferable for a particular application, other dimensions may be utilized or adjusted based on part size and real estate concerns, i.e., line side and facility equipment space constraints, logistic and storage constraints, and the like.

The base portion 22 includes a plurality of perimeter plates 64, operably connected near the top of the base portion 22 along the first and second sidewall portions 24,26 and the back portion 28 in order to prevent damage during transport, i.e., to prevent forklifts from penetrating into the usable space of the reusable container 10. The base portion 22 includes spaced apart hollow tubes 68 adapted to receive forks of a forklift or an alternative material handling device in order to transport the reusable container 10. The hollow tubes 68 are operably connected to the front beam 38, first and second side beams 40,42, and the back beam 44. Expanded metal sheeting 66 is operably connected to the top of the base portion 22 to allow an operator to walk into the reusable container 10.

Figure 2:
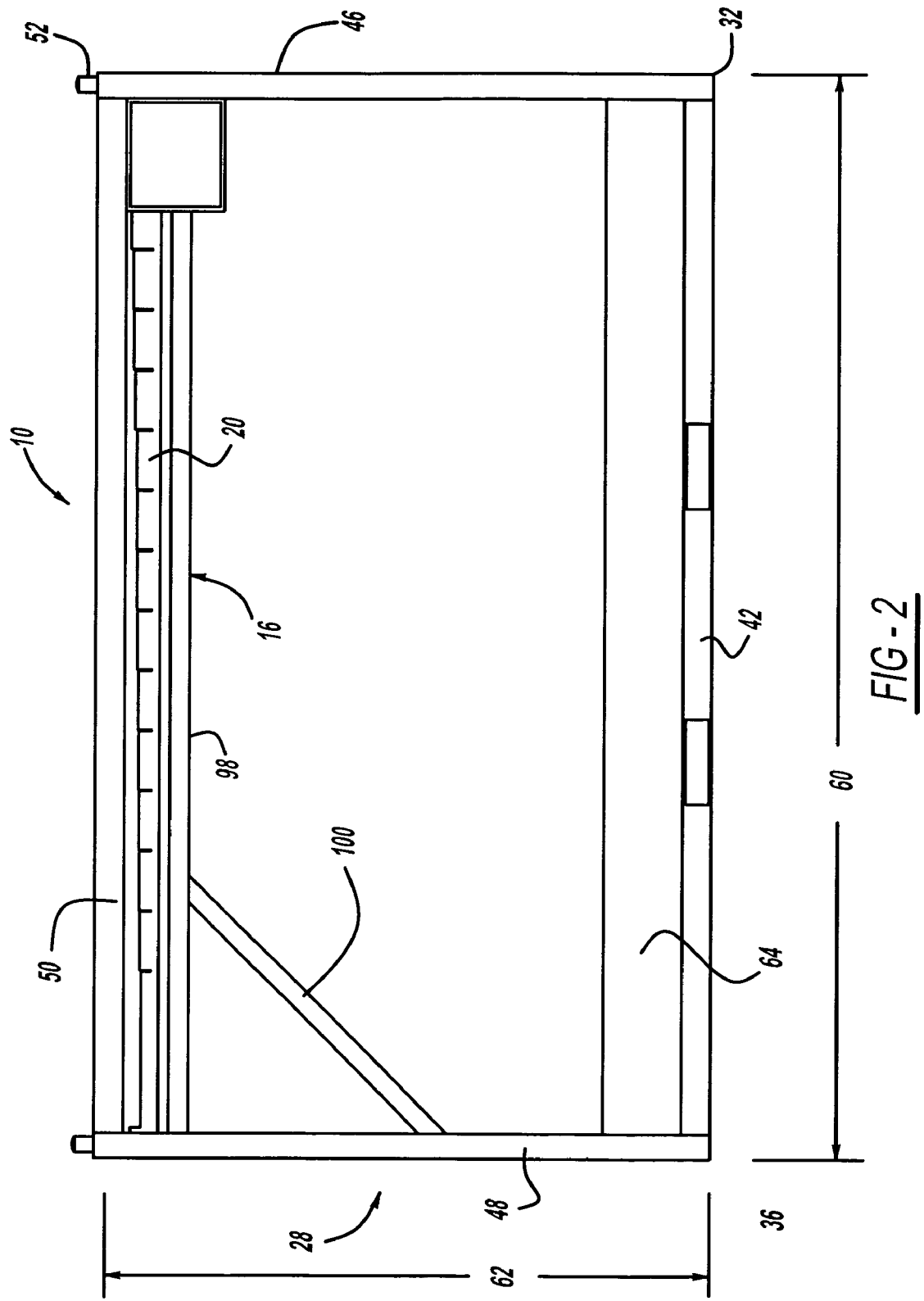
FIG. 2 is a side view of the reusable container as seen from the left side of FIG. 1, according to the present invention.
Figure 5:
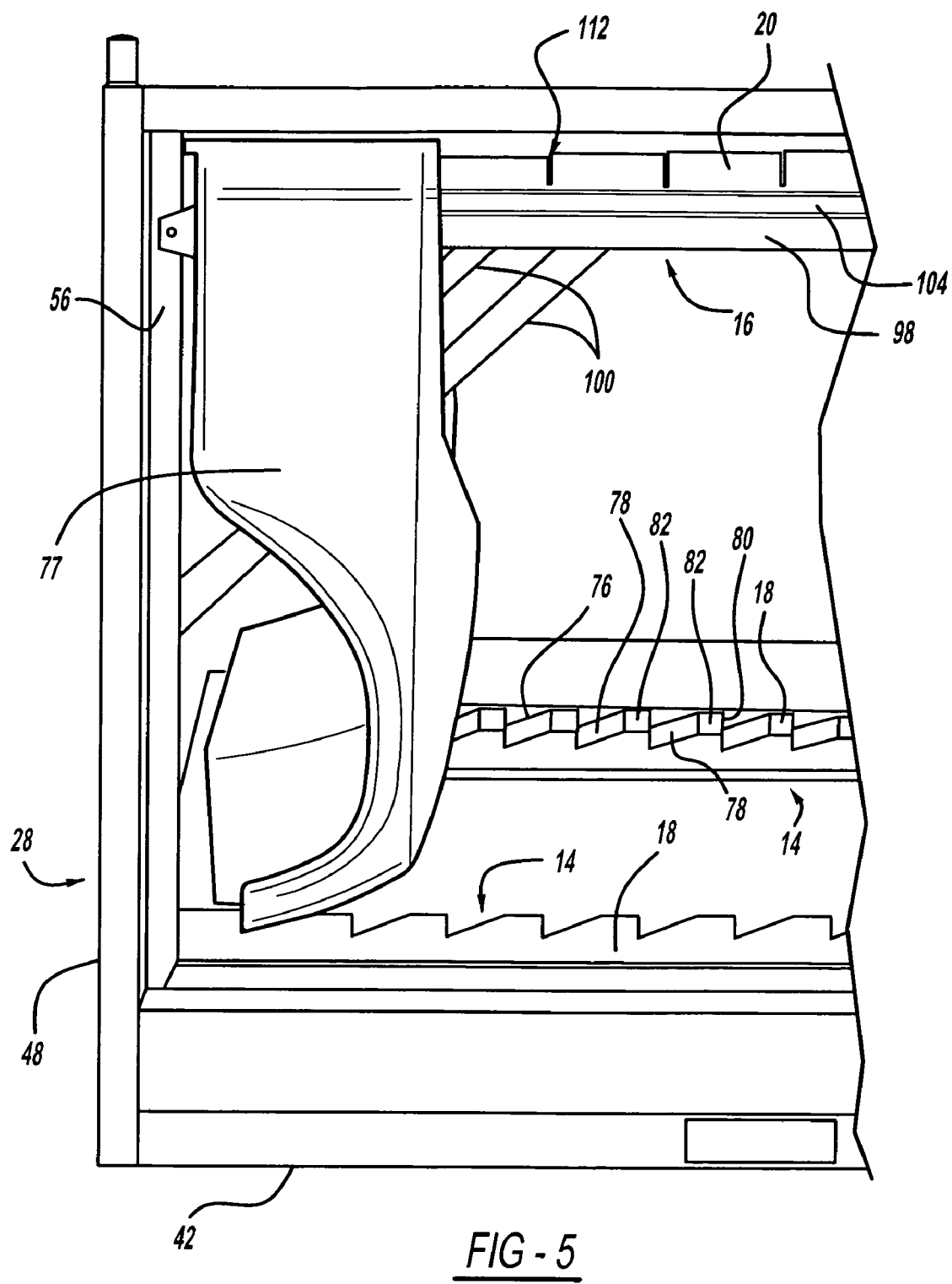
FIG. 5 is a segmented partially elevated side view illustration showing a golf car component engaged in recesses and profiles formed in a bottom and a top dunnage piece of the reusable container, according to the present invention.

Referring to the Figures generally, and more particularly to FIGS. 1 and 5, there is illustrated two bottom support members 14 that are operably spaced apart. As illustrated further in FIG. 3, each bottom support member 14 has a first channel 70 along its entire axial length adapted to receive the bottom dunnage piece 18, i.e., adapted with opposing C-channel like shapes along the entire length of the first channel 70 that are operable to receive a T-shaped shaped retention section 72 formed on the bottom dunnage piece 18. The bottom dunnage piece 18 can further be secured to the first channel 70 by a plurality of bolts 71. The bottom support member 14 extends generally from the front beam 38 to the back beam 44 and is operably connected to the base 22, such that a flat portion 74 of the first channel 70 faces downward. As illustrated in FIGS. 1, 3 and 5-6, to further facilitate engagement with golf car components, the bottom dunnage pieces 18 can be operably and opposedly sloped downwardly from the outermost side of each bottom dunnage piece 18 towards the center of the reusable container 10 to engage the contour of respective golf car components.

It is understood that alternatively, the bottom support member 14 can include an intermediary beam disposed between the first channel 70 and the base portion 22. It is further understood that the present invention requires at least one bottom support member 14 and preferably two bottom support members 14. It is further understood that the bottom dunnage piece 18 shown as formed of one piece can alternatively be formed of a plurality of bottom dunnage pieces 18 operably retained by the first channel 70.

Figure 3:
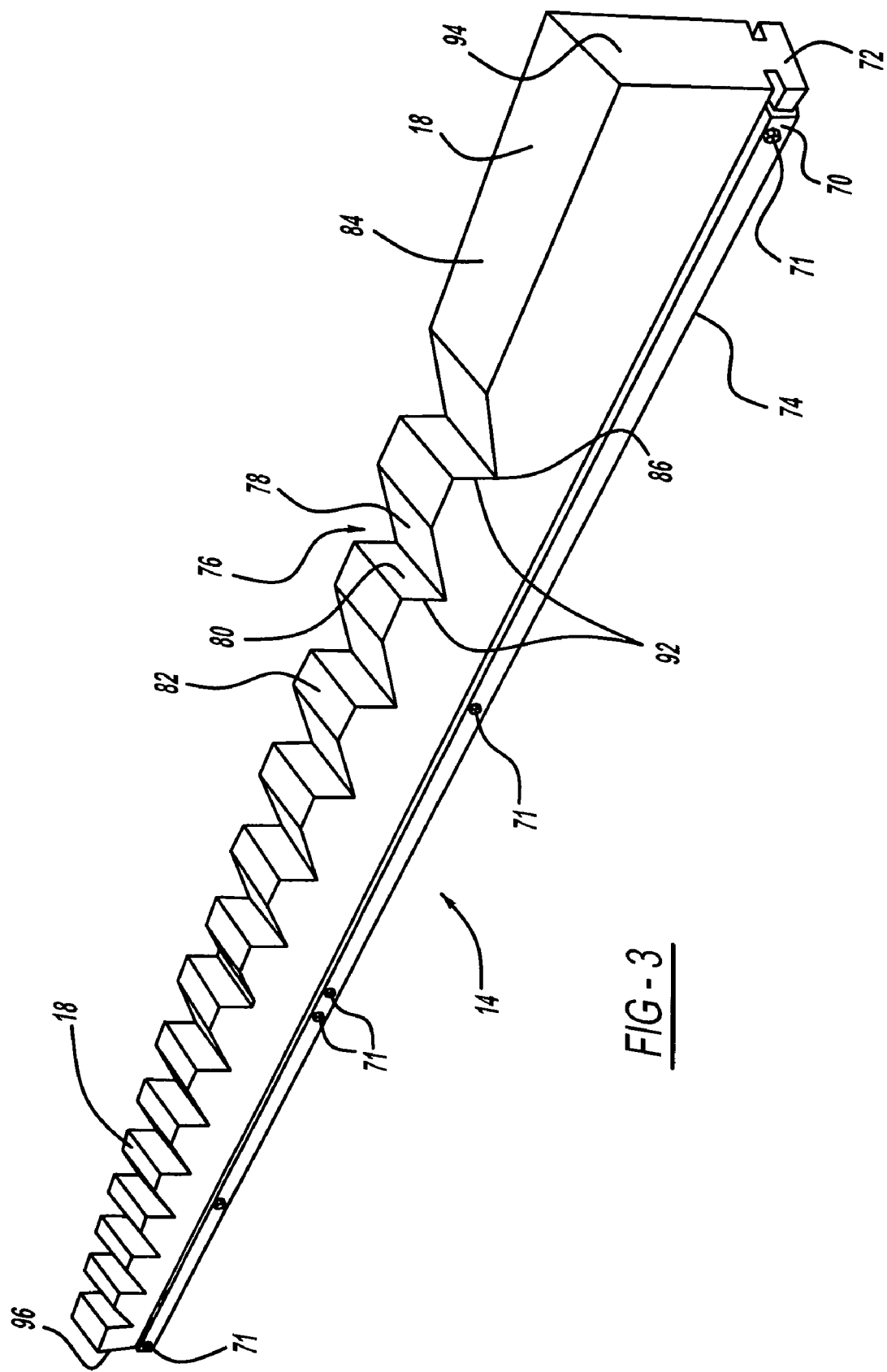
FIG. 3 is a perspective view of a bottom support member and a bottom dunnage piece of the reusable container, according to the present invention.

Referring to the Figures generally, and more particularly to FIGS. 3 and 6, the bottom dunnage piece 18 includes a plurality of recesses 76 formed in series. A first and a second contact surface 78,80 of each recess 76 is adapted to receive and engage a golf car component 77, preferably a rear fender surface of a golf car body. A third contact surface 82 can extend between each of the recesses 76. The third contact surface 82 is adapted to allow the golf car component to enter the recess 76 and can provide added support to the golf car component. The first contact surface 78, when viewed from the front of the reusable container 10, operably slopes downwardly from a top 84 of the bottom dunnage piece 18 to a bottom 86 of the recess 76 along the longitudinal axis of the bottom dunnage piece 18. The second contact surface 80 extends substantially vertically between the bottom 86 of the recess 76 to the top 84 of the bottom dunnage piece 18. The contour and dimensions of the first, second, and third contact surfaces 78,80,82 are determined by features of the golf car component. It is understood, for example, that the angle, i.e., dihedral angle, associated with the first and second contact surfaces 78,80 can vary.

Figure 4:
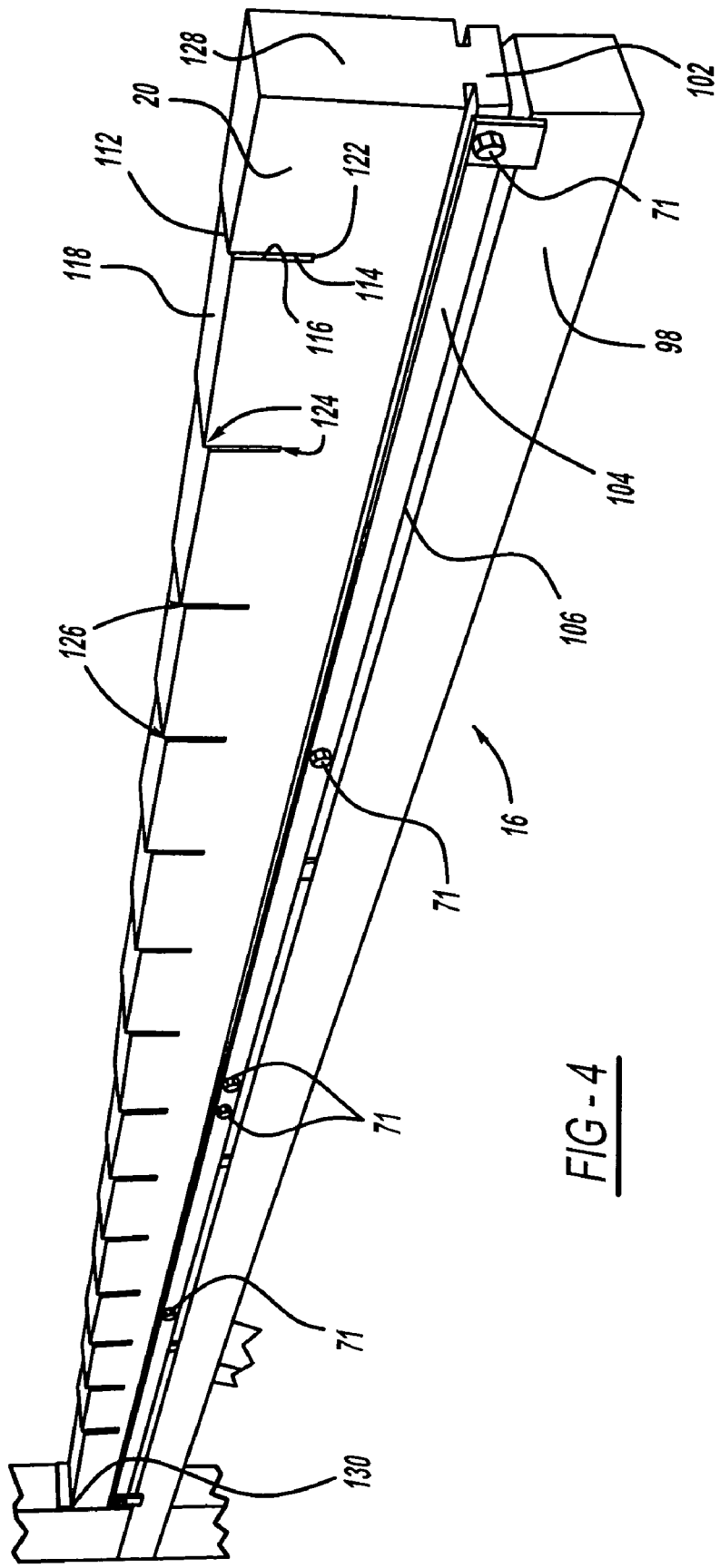
FIG. 4 is a perspective view of a top support member and a top dunnage piece of the reusable container, according to the present invention.

A distance 92 extending between the second contact surface 80 of each recess 76 is operable for allowing nesting of the golf car components while still helping to prevent contact between the respective golf car components. Nesting of the golf car components allows component containment and maximum storage capacity within the reusable container 10. To further facilitate nesting, the bottom dunnage piece 18 can have a first end 94 disposed near the front of the reusable container 10 with an operable height that is greater than the height of a second end 96 disposed near the back of the reusable container 10, i.e., 3 inches higher, such that the golf car components can be progressively nested in a stepped arrangement. As can be seen in the figures, the location of the bottom 86 of the recesses 76 can vary along the length of the bottom dunnage piece 18. This provides for a series of steps, which allows for starting of the golf car components in a "waterfall" time nested arrangement. It is understood that alternatively the second end 96 can be higher than the first end Referring to the Figures generally, and more particularly to FIG. 1, there is illustrated two top support members 16 that are operably spaced apart. Each top support member 16 includes a cantilever arm 98, a gusset 100, and the top dunnage piece 20. The cantilever arm 98, preferably formed of a metal beam, is operably fixedly connected near a top part 108 of the support beam 56. The cantilever arm 98 extends generally from the support beam 56 to the front beam 38, i.e., the entire longitudinal length of the usable space of the reusable container 10. The gusset 100, i.e., preferably formed of a metal tube, extends between an underside of the cantilever arm 98 and the support beam 56 at an angle 110 operable to further provide support and stability to the cantilever arm 98. As shown in FIG. 4, each top support member 16 has a second channel 104 disposed on the top of the cantilever arm 98 along its entire axial length. The second channel 104 is adapted to receive the top dunnage piece 20, i.e., adapted with opposing C-channel like shapes along its entire axial length that are operable to receive a respective T-like shaped brace section 102 formed in the top dunnage piece 20. A flat section 106 of the second channel 104 is operably connected to the top of the cantilever arm 98. The top dunnage piece 20 can further be secured to the second channel 104 by a plurality of bolts 71.

It is understood that the present invention requires at least one top support member 16, and preferably two top support members 16. It is further understood that the top dunnage piece 20 shown as formed of one piece can alternatively be formed of a plurality of top dunnage pieces 20 operably retained by the second channel 104.

Referring to the Figures generally, and more particularly to FIGS. 1-2, 4-5 and 7, the top dunnage piece 20 includes a plurality of profiles 112 formed such that front and back contact surfaces 114,116 of each profile 112 are adapted to receive and support a golf car component, preferably an upper flange surface of the golf car body. A top contact surface 118 extends between each profile 112 and is adapted to allow the golf car component to enter the profile 112 and can provide added support to the golf car component. The front and back contact surfaces 114,116 extend from the top contact surface 118 of the top dunnage piece 20 to a profile bottom 122. The distance between the top contact surface 118 of the dunnage piece 20 and the profile bottom 122 forms a profile height 124. As can be seen in the figures, the location of the profile heights 124 can vary along the length of the top dunnage piece 20. This provides for a series of steps, which allows for starting of the golf car components in a "waterfall" time nested arrangement. The contours and dimensions of the front, back, and top contact surfaces 114,116,118 are determined by features of the golf car component.

A length 126 of the top contact surface 118, i.e., the distance between each profile 112, is operable for allowing nesting of the golf car components while still preventing contact between the respective golf car components. To further facilitate nesting, the top dunnage piece 20 can have a beginning end 128 disposed near the front of the reusable container 10 with an operable height that is greater than the height of a secondary end 130, i.e., 3 inches higher, such that the plurality of profiles are progressively raised in a stepped arrangement. It is understood that alternatively the secondary end 130 can be higher than the beginning end 128.

Referring to the Figures in general, the top dunnage piece 20 coincides with the respective bottom dunnage piece 18 to optimize the usable golf car component storage space within the reusable container 10. For example, the bottom dunnage piece 18 may have a decreased height from the first end 94 to the second end 96 at the same rate as the beginning end 128 to the secondary end 130 of the top dunnage piece 20 to accommodate nesting of the golf car components. As shown further in FIGS. 1 and 5, the recesses 76 of each bottom dunnage piece 18 are in cooperation with the profiles 112 of each top dunnage piece 20 to operably and nestably receive golf car components. Preferably, the reusable container 10 nestably receives 14 golf car components.

Dunnage is herein defined to generally include a reusable piece that is operably connected to the reusable container 10 and can be formed in order to receive, retain, support, and protect a golf car component during storage and shipment, i.e., including formed foam, cast urethane, and fabric. Dunnage can be removed and replaced as necessary for repair, cleaning, and maintenance. Preferably, the top and bottom dunnage 18,20 is a 4 pound crosslink polyethylene foam formed by waterjet. It is understood that alternative foam may be used for increased rigidity and durability, i.e., 6 pound crosslink polyethylene foam or foams made of alternative materials. It is further understood that additional foam can be attached on the front end posts 46 and top beams 50 to help prevent damaging the golf car components if contacted while loading or unloading the reusable container 10, i.e., foam strips attached by self adhesive backing, flush pop rivets, and the like.

When in operation the operator holds a golf car component 77 (shown in FIG. 5), preferably a golf car body with the rear fender facing downward. The operator aligns an opening in the golf car component with the top support members 16, walks into the reusable container 10 and stops near the back portion 28. The operator aligns the golf car component with each of the two bottom dunnage piece 18 recesses 76 and the two top dunnage piece 20 profiles 112 so that the rear fender engages each corresponding recess 76 and the corresponding upper flange surface of the golf car component engages each corresponding profile 112, i.e., four points of contact between the dunnage and the golf car component. The operator exits the reusable container 10 and repeats the process for the remaining recesses 76 and profiles 112 until every recess 76 and profile 112 contains a golf car component respectively, i.e., 14 golf car components per reusable container 10. The end user operator unloads the reusable container 10 in reverse order until the reusable container 10 is empty.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A reusable container for use in transporting a plurality of vehicle body part components, said reusable container comprising:
   a body having a base portion, opposing first and second sidewall portions, and a back portion;
   at least one bottom support member connected to at least one back beam of said base portion and extending substantially from said at least one back beam to at least one front beam of said base portion, each of said at least one front beam and said at least one back beam being connected to said first and second sidewall portions, wherein said bottom support member receives a bottom dunnage piece along an axial length of said bottom support member;
   at least one top support member connected to at least one support beam of said back portion and extending substantially perpendicularly from said at least one support beam, wherein said top support member receives a top dunnage piece along an axial length of said top support member;
   a plurality of recesses formed in said bottom dunnage piece, said plurality of recesses having a stepped arrangement;
   a profile formed in said top dunnage piece, said profile having a stepped configuration; and
   wherein each of said plurality of recesses and each of said plurality of profiles have contact surfaces which receive and support said plurality of vehicle body part components.

2. The reusable container of claim 1, wherein said top dunnage piece and said bottom dunnage piece are formed of crosslink polyethylene foam.

3. The reusable container of claim 1, wherein said top dunnage piece and said bottom dunnage piece are formed of four pound crosslink polyethylene foam.

4. The reusable container of claim 1, wherein said top dunnage piece are each formed of one piece and said bottom dunnage piece are each formed of one piece.

5. The reusable container of claim 1, wherein said top dunnage piece is formed of at least two pieces, and said bottom dunnage piece is formed of at least two pieces.

6. The reusable container of claim 1, wherein a first end of said bottom dunnage piece is greater in height than a second end of said bottom dunnage piece.

7. The reusable container of claim 1, wherein a second end of said bottom dunnage piece is greater in height than a first end of said bottom dunnage piece.

8. The reusable container of claim 1, wherein a beginning end of said top dunnage piece is greater in height than a secondary end of said top dunnage piece.

9. The reusable container of claim 1, wherein a secondary end of said top dunnage piece is greater in height than a beginning end of said top dunnage piece.

10. The reusable container of claim 1, said bottom dunnage piece further comprising at least one contact surface sloped at a dihedral angle for supporting one or more of said plurality of vehicle body part components.

11. The reusable container of claim 1, wherein said bottom support member further comprises a C-shaped first channel adapted to receive and retain a retention section formed in said bottom dunnage piece.

12. The reusable container of claim 1, wherein said top support member further comprises a C-shaped second channel adapted to receive and retain a brace section formed in said top dunnage piece.

13. The reusable container of claim 1, said at least one top support member further comprising a cantilever arm and a gusset at least partly supporting the weight of said plurality of vehicle body part components.

14. The reusable container for golf car components of claim 1, wherein each of said bottom support members further comprise a plurality of bolts extending through a retention section and said bottom dunnage piece for retaining said bottom dunnage piece in said retention section.

15. The reusable container of claim 1, wherein said top support member further comprise a plurality of fasteners extending through a brace section and said top dunnage piece for retaining said top dunnage piece in said retention section.

16. The reusable container of claim 1 further comprising at least two bottom support members and at least one top support member.

17. The reusable container of claim 16 further comprising at least two top support members.

18. A reusable container for golf car components, comprising:
   a body having a base portion, opposing first and second sidewall portions, and a back portion;
   a plurality of bottom support members connected to said base portion, each of said plurality of bottom support members having a first channel which receives a retention section formed on a bottom dunnage piece, said bottom dunnage piece one of a plurality of dunnage pieces;
   a plurality of top support members connected to said back portion, each of said plurality of top support members having a cantilever arm coupled to a second channel, said second channel receives a brace section formed on a top dunnage piece, said top dunnage piece one of a plurality of top dunnage pieces, wherein each of said plurality of top support members further includes a gusset, said cantilever arm and said gusset at least partly support the weight of a plurality of golf car components;
   a plurality of recesses formed in each of said plurality of bottom dunnage pieces in a stepped arrangement;
   a profile formed in each of said plurality of top dunnage pieces, said profile having a stepped configuration; and
   wherein each of said plurality of recesses and each of said plurality of profiles have contact surfaces which nestably receive and operably supporting said plurality of golf car components.

19. The reusable container for golf car components of claim 18, wherein each of said plurality of top dunnage pieces and each of said plurality of bottom dunnage pieces are formed of four pound crosslink polyethylene foam.

20. The reusable container for golf car components of claim 18, wherein each of said plurality of top dunnage pieces decreases in height from one end to another end, and said plurality of bottom dunnage pieces gradually decreases in height from one end to another end.

21. The reusable container for golf car components of claim 18, each of said plurality of bottom dunnage pieces further comprising at least one contact surface formed at a dihedral angle for supporting one or more of said plurality of golf car components.

22. A method for using a reusable container for golf car components, comprising:
   providing a body having a base portion, opposing first and second sidewall portions, and a back portion;
   providing a plurality of bottom support members operably connected to said base portion, wherein each of said plurality of bottom support members receives a bottom dunnage piece having a plurality of recesses formed in a stepped arrangment;
   providing a plurality of top support members connected to said back portion, wherein each of said plurality of top support members receives a top dunnage piece having a profile formed in a stepped configuration; and
   nestably loading one or more of a plurality of golf car components onto said top dunnage piece of each of said plurality of top support members by aligning an opening in said one or more of a plurality of golf car components with said top support members and nestably loading said one or more of said plurality of golf car components onto said bottom dunnage piece of each of said plurality of bottom support members by selectively aligning said one or more of a plurality of golf car components with one or more of said plurality of recesses of each of said two bottom dunnage pieces and one or more of said plurality of profiles of said two top dunnage pieces such that contact surfaces of said plurality of profiles and contact surfaces of said plurality of recesses support one or more of said plurality of golf car components.

* * * * *